H. Nash,
Washing Machine,
Nº 51,958.   Patented Jan. 9, 1866.
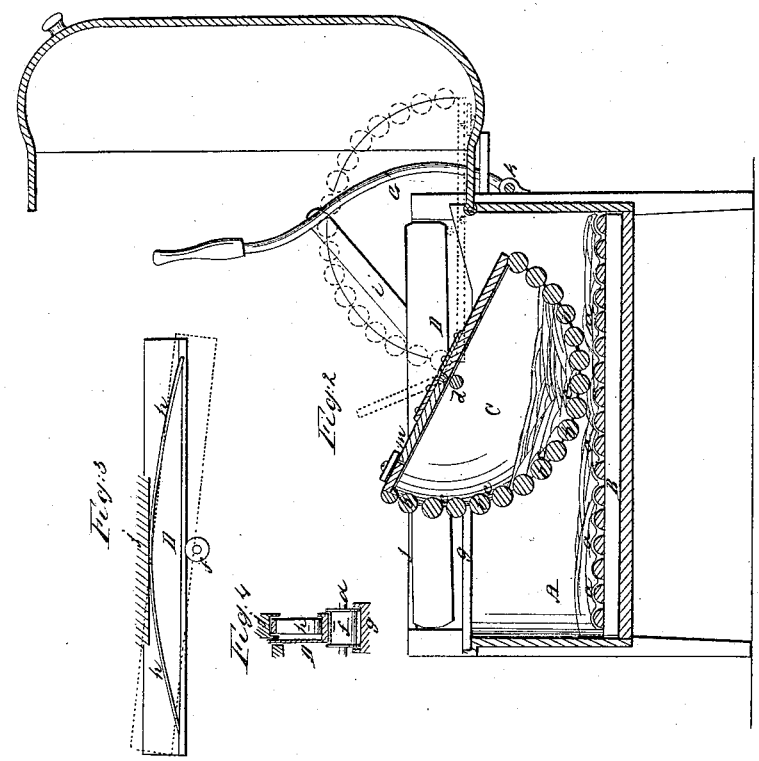
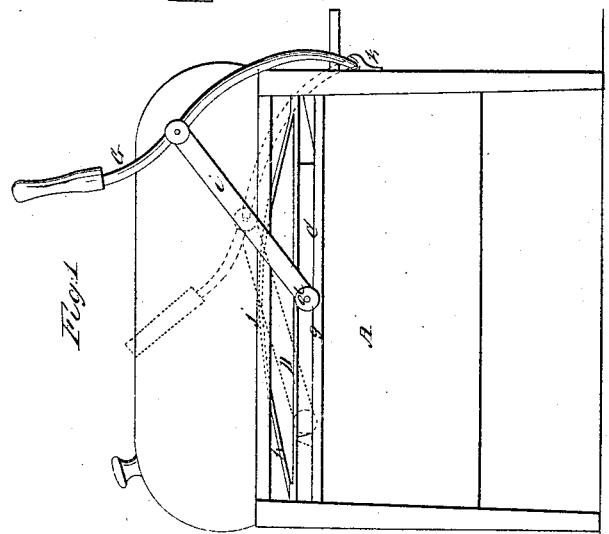
Witnesses:
J. A. Davis
R. F. Osgood.
Inventor
Hiram Nash.
By J. Fraser & Co.
Attys.

UNITED STATES PATENT OFFICE.

HIRAM NASH, OF CINCINNATI, OHIO.

WASHING-MACHINE.

Specification forming part of Letters Patent No. 51,958, dated January 9, 1866.

*To all whom it may concern:*

Be it known that I, HIRAM NASH, of Cincinnati, in the county of Hamilton and State of Ohio, have invented certain new and useful Improvements in Washing-Machines; and I do hereby declare that the following is a full and exact description thereof, reference being had to the accompanying drawings, making part of this specification.

Figure 1 is a side elevation of my improved machine; Fig. 2, a central vertical section; Figs. 3 and 4, longitudinal and cross-sectional views, respectively, of the spring arrangement for producing pressure on the rubber or presser.

Like letters of reference indicate corresponding parts in all the figures.

My improved machine is of that class in which a traveling rubber or presser is employed, moving from one end to the other over a horizontal bed, the action being more a pressing than a rubbing one.

The invention consists, essentially, in the spring arrangement for producing pressure on the rubber in all positions of its traveling action, and in the lever arrangement for operating the rubber, and also forming the rubber in the form of a segment of a circle, and so arranging it that at one end of the bed it may be turned up to admit the clothes.

As represented in the drawings, A is a suitable receptacle or box, in which is situated a washing-bed, B, composed of ribs or corrugations $a\ a$. On this bed the clothes to be washed are placed. Above this bed is situated a rubber or presser, C, forming a segment of a cylinder. This rubber is also provided with ribs or corrugations $b\ b$ with openings $c\ c$ between. The axis $d$ of the rubber extends through from side to side, and has at opposite extremities, respectively, friction-rollers $f f$, which run upon ways $g\ g$, Fig. 4, extending the whole length of the machine. On top the rollers rest bars D D, which are pressed down by springs $h\ h$ reacting against rigid portions $j j$ of the receptacle. The bars D D are made to extend the whole length, or nearly so, of the machine. The springs $h\ h$ may be made of the elliptical form shown, or of any other that will accomplish the desired purpose. Spiral or india-rubber springs might be employed. The advantage of this arrangement is obvious. The action of the machine is a pressing rather than a rubbing one, and in order to give the requisite pressure to the rubber C considerable force is necessary on top. The employment of the springs $h\ h$ and bars D D resting on the friction-rollers produces this pressure at all positions, whether in the center of the machine or at the extremities. At the same time the friction-rollers allow the rubber to be moved beneath the pressure with great ease.

I am aware that it is common to allow an ordinary rubber simply swinging on its axis a certain degree of elasticity or yieldingness; but I am not aware that this effect has ever been accomplished in a machine where the rubber or presser travels from one end to the other.

On opposite sides of the machine the axis $d$ of the rubber is jointed to connecting-rods $i\ i'$, which connect at the opposite end in a similar manner with operating levers or handles G G', situated, also, respectively, on opposite sides of the machine, and connected by the common axis $k$. The advantage of this arrangement is that I am enabled to give the reciprocating action to the traveling rubber by simply operating the levers. To do this the operator can stand at the end of the machine and operate either one or both of the levers, or he can stand at either side and accomplish the same result. This arrangement of the levers and connecting-rods have a particular combination and relation with the traveling rubber, for as the latter passes from end to end of the machine its axis or shaft will move with it, and therefore, if a crank or lever were connected directly therewith, the action from end to end of the stroke would be great; but the double action of the levers and connecting-rods obviates this difficulty, and at the same time enables me to operate from the end or either side.

Machines are in use in which an entire roller or cylinder of considerable weight travels over the clothes, being operated from one end by a handle or handles. By making the rubber C of only a segment of a cylinder it turns up away from the bed B at each end of the machine, as indicated by red lines in Fig. 2, and the whole space over the bed is thus left free and unobstructed, so that the clothes may be inserted or removed without any difficulty whatever. The rubber turns up on its own axis without any depression of the levers or other unusual action. If a whole or entire roller were employed the same would either have to be lifted out of the receptacle by positive action, or else the levers connected therewith would have to be so arranged and connected as to be depressed to an unusual degree.

I prefer to place a cover, *m*, over the hollow rubber, so that dirty clothes may be placed therein and receive a preliminary agitation in the water to partially clean them while those on the bed are being washed.

What I claim as my invention, and desire to secure by Letters Patent, is—

1. The combination of the longitudinal bars D D, springs *h h*, and friction-rollers *f f*, with the traveling rubber C, when so arranged as to produce pressure on said rubber in all positions, substantially as set forth.

2. In combination with the traveling rubber C, thus arranged, the arrangement of the jointed double connecting-rods *i i'*, and double levers G G', in such a manner that the rubber may be operated by a direct action, either at the end or side of the machine, as described.

3. Forming the rubber C in a segment of a cylinder, and so arranging it, in combination with the bed B, that it may be turned up at each end for the reception or removal of the clothes, and without removing it from the receptacle or depressing the levers, substantially as described.

4. The special construction and arrangement of the operating parts of the machine, the same consisting of the rubber C, rollers *f f*, bars and springs D *h*, connecting-rods *i i'*, and levers G G', the whole operating substantially in the manner and for the purpose herein set forth.

HIRAM NASH.

Witnesses:
JOHN W. APPLEGATE,
GEO. C. FERRIS.